(12) United States Patent
Isenhour et al.

(10) Patent No.: US 9,335,493 B2
(45) Date of Patent: May 10, 2016

(54) LIQUID DISPLACING OPTICAL COUPLING ASSEMBLIES

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: CORNING CABLE SYSTEMS LLC, Hickory, NC (US)

(*) Notice: Subject to any disclaimer, the term of this patent is extended or adjusted under 35 U.S.C. 154(b) by 236 days.

(21) Appl. No.: 13/779,895

(22) Filed: Feb. 28, 2013

(65) Prior Publication Data

US 2014/0241672 A1  Aug. 28, 2014

(51) Int. Cl.
  *G02B 6/36* (2006.01)
  *G02B 6/42* (2006.01)
  *G02B 6/32* (2006.01)
  *G02B 6/38* (2006.01)

(52) U.S. Cl.
  CPC ............. *G02B 6/4206* (2013.01); *G02B 6/322* (2013.01); *G02B 6/3853* (2013.01); *G02B 6/3885* (2013.01); *G02B 6/4214* (2013.01); *G02B 6/4292* (2013.01)

(58) Field of Classification Search
  CPC ...... G02B 6/4214; G02B 6/32; G02B 6/3853; G02B 6/3861; G02B 6/322; G02B 6/4251; G02B 6/325; G02B 6/3512; G02B 6/3526; G02B 6/3528; G02B 6/4243; G02B 6/421

USPC .......... 385/61, 65, 66, 72, 74, 77–80, 83, 84, 385/93
See application file for complete search history.

(56) References Cited

U.S. PATENT DOCUMENTS

| | | | |
|---|---|---|---|
| 5,914,458 A | 6/1999 | Folsom et al. | 102/201 |
| 6,302,596 B1 * | 10/2001 | Cohen et al. | 385/93 |
| 2009/0116793 A1 | 5/2009 | Nishimura et al. | |
| 2009/0323076 A1 | 12/2009 | Li et al. | 356/479 |
| 2010/0135618 A1 | 6/2010 | Howard et al. | 385/79 |
| 2011/0150400 A1 | 6/2011 | Nishimura et al. | 385/83 |
| 2011/0262083 A1 | 10/2011 | Tamura et al. | 385/93 |
| 2012/0033917 A1 * | 2/2012 | Fortusini et al. | 385/72 |
| 2012/0106904 A1 | 5/2012 | Herb et al. | 385/93 |
| 2012/0189254 A1 | 7/2012 | Wang et al. | |
| 2013/0071063 A1 * | 3/2013 | Aoki | G02B 6/327 385/33 |

* cited by examiner

*Primary Examiner* — Kaveh C Kianni
*Assistant Examiner* — Hung Lam (57) ABSTRACT

According to various embodiments, an optical assembly may include a ferrule element having a fiber guiding portion separated from an in-wall locating feature by an access region, and a lens element positioned opposite access region and aligned with the in-wall locating feature. The optical assembly also includes an optical component coupled to and extending through the fiber guiding portion and the access region such that a proximal end of the optical component is positioned within the in-wall locating feature. The optical component includes a coated portion that is coated with an insulator in positions proximate to the fiber guiding portion and an uncoated portion substantially free of the insulator in positions proximal to the in-wall locating feature. The optical assembly also includes a lens cover coupled to the ferrule element and positioned proximate to the lens element.

18 Claims, 5 Drawing Sheets

LIQUID DISPLACING OPTICAL COUPLING ASSEMBLIES

BACKGROUND

1. Field

The present disclosure generally relates to optical assemblies and, more particular, optical coupling assemblies comprising a cover associated with a plurality of optical data-transferring components.

2. Technical Background

Fiber optic cables are an attractive alternative to bulky traditional conductor cables (e.g., copper), especially as data rates increase. As the use of fiber optics migrates into numerous consumer electronics applications, such as connecting computer peripherals by the use of fiber optic cable assemblies, there will be a consumer-driven expectation for cables having improved performance, compatibility with future communication protocols, and a broad range of use. Current opto-mechanical interfaces utilized to optically couple an optical cable assembly to active optical components of an electronics device require precise structures to properly align the optical components of the optical assembly with the laser (s) and/or photodiode(s) of the electronics device.

Accordingly, alternative optical coupling assemblies, optical cable assemblies, and electronic devices are desired.

SUMMARY

Embodiments of the present disclosure relate to optical coupling assemblies, such as optical assemblies utilized by optical cable assemblies and electronic devices, for optical communication. As an example, an optical cable assembly may comprise an optical assembly at each end that is configured to mate with corresponding optical assemblies of electronics devices so that two (or more) coupled electronics devices may communicate with one another via optical signals over the optical cable assembly.

Exemplary optical assemblies according to the present disclosure include a coupling face, a lens cover positioned within the coupling face, and at least one positioning feature. The lens cover allows for the positioning of one or more optical components, such as laser diodes, photo diodes, optical fiber ends, and the like, such that the optical components are reliably positioned on an optical interface of the lens cover. In general, a user may position the optical assembly in an appropriate position such that the optical components are aligned with a corresponding optical interface in an electronics device.

The electronics device and the optical cable assembly are optically coupled via an optical interface on both the electronics device and the optical cable assembly. In some embodiments, the optical interface may be described as a planar optical interface, wherein the optical interface is generally planar with respect to a coupling face, such as the front face of a connector or a housing of an electronics device (e.g., the optical interface is angled with respect to the coupling face within a range of about zero degrees to about ten degrees). The electronics device may be any electronics device, including, but not limited to, a portable media player, a cellular phone (e.g., a "smart phone"), a data storage device (e.g., an external hard drive or a flash-based memory device), a digital camera, a personal computer, laptop, notebook, or tablet computer, a camcorder, a mobile electronics device, a server, etc. The electronics device may be any electronics device wherein data is transferred between one electronics device to another electronics device.

Embodiments described herein enable electronics devices to be optically coupled to each other to transfer data optically between the coupled electronic devices. In one embodiment, the electronics devices convert electrical signals into optical signals for optical transmission over the optical cable assembly for receipt by one or more optically coupled electronics devices. The electronics devices may also be configured to receive optical signals over the optical cable assembly and convert such received optical signals into electrical signals.

In one embodiment, an optical assembly includes a ferrule element having a fiber guiding portion separated from a locating feature by an access region, and a lens element positioned opposite access region and aligned with the locating feature, which may be at least partially in-wall locating feature. The optical assembly also includes an optical component coupled to and extending through the fiber guiding portion and the access region such that a proximal end of the optical component is positioned within the locating feature. The optical component includes a coated portion that is coated with an insulator in positions proximate to the fiber guiding portion and an uncoated portion substantially free of the insulator in positions proximal to the locating feature. The optical assembly also includes a lens cover coupled to the ferrule element and positioned proximate to the lens element.

In another embodiment, an optical assembly includes a ferrule element having a fiber guiding portion separated from an in-wall locating feature by an access region, a lens element positioned opposite the access region and aligned with an in-wall locating feature, and an adhesion surface positioned opposite the in-wall locating feature to at least partially surround the lens element. The adhesion surface has a textured portion. The optical assembly also includes a lens cover coupled to the adhesion surface of the ferrule element and positioned proximate to the lens element, where the textured portion of the adhesion surface increases a surface area of the adhesion surface as compared to the projected surface area of the adhesion surface to improve a bonding interface between the ferrule element and the lens cover.

In yet another embodiment, an optical cable includes a ferrule element having a plurality of fiber guiding portions separated from a plurality of corresponding in-wall locating features by an access region, and a plurality of lens elements positioned opposite the access region and aligned with the in-wall locating features. The optical cable also includes a plurality of optical components each coupled to and extending through the fiber guiding portion and the access region such that a proximal end of each of the optical components is positioned within one of the in-wall locating features. Each of the optical components include a coated portion that is coated with an insulator in positions proximate to the fiber guiding portions and an uncoated portion substantially free of the insulator in positions proximal to the in-wall locating features. The optical cable further includes a lens cover coupled to the ferrule element and positioned proximate to the lens elements.

In yet another embodiment, an optical assembly includes a ferrule element having a fiber guiding portion separated from an in-wall locating feature by an access region, a reflecting surface biased within the ferrule element and positioned proximate to the in-wall locating feature, and a lens positioned within the ferrule element and oriented transverse to the fiber guiding portion. The optical assembly also includes an optical component extending through the fiber guiding portion and the access region such that a proximal end of the optical component is positioned within the in-wall locating feature. The optical component includes a coated portion that is coated with an insulator in positions proximate to the fiber guiding portion and an uncoated portion substantially free of the insulator in positions proximal to the in-wall locating feature. The lens and the reflective surface are positioned such that optical signal emitted by the optical component is directed by the reflecting surface through the lens.

Additional features and advantages are set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature, and are not intended to limit the subject matter defined by the claims. The following detailed description of the illustrative embodiments can be understood when read in conjunction with the following drawings, where like structure is indicated with like reference numerals and in which:

DETAILED DESCRIPTION

Exemplary embodiments of the present disclosure are directed to optical assemblies, such as optical coupling assemblies utilized by optical cable assemblies and electronic devices, wherein electrical signals generated by a host or client electronic device are converted to optical signals by a transceiver circuit and transmitted over one or more optical components. Optical signals received by a host or client electronics devices are converted from optical signals into electrical signals by the transceiver circuit. Embodiments described herein may enable simple planar, liquid-displacing optical interfaces that reliably position the optical components within the optical assembly. As used herein, the term planar means generally flat, such that the optical interface or surface is accessible and easily wiped by a user. In some embodiments, the coupling face may comprise structure features, but the region of optical interface may remain substantially planar. Optical assemblies, as well as optical cable assemblies, connector assemblies, and electronic devices will be described in further detail herein with specific reference to the appended figures.

Figure 1:
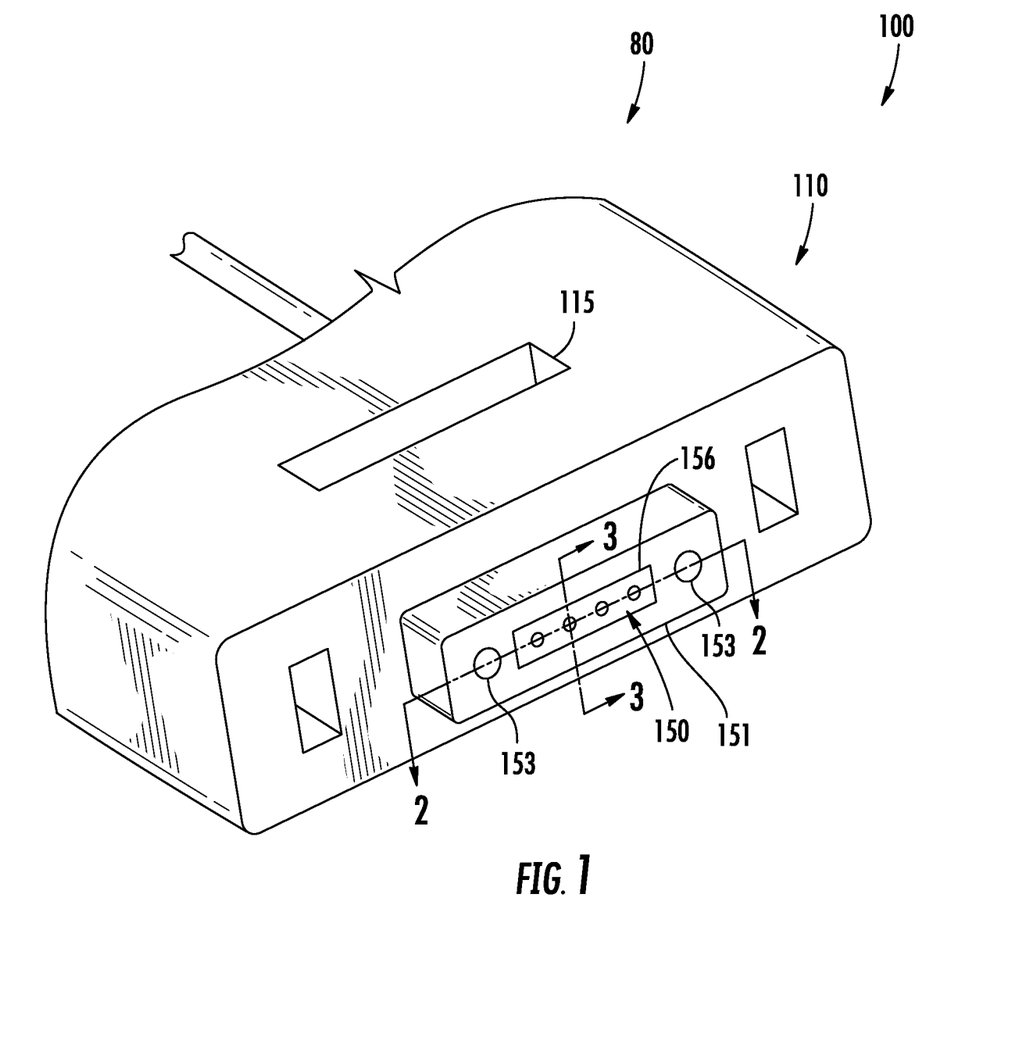
FIG. 1 schematically depicts a perspective view of an optical assembly according to one or more embodiments shown and described herein.

Referring now to FIG. 1, an optical assembly 100 for an optical cable 80 is depicted. The optical assembly 100 includes a ferrule element 110 having a coupling face 151, a lens cover 150 positioned within the coupling face 151, and at least one positioning feature 153. The lens cover 150 allows for the positioning of one or more optical components (not shown in FIG. 1), such as laser diodes, photo diodes, optical fiber ends, and the like, such that the optical components are reliably positioned relative to an optical interface 156 of the lens cover 150. In general, a user may position the optical assembly 100 in an appropriate position such that the optical components are aligned with a corresponding optical interface in an electronics device (not shown).

The electronics device and the optical assembly 100 are optically coupled via an optical interface 156 on both the electronics device and the optical cable 80. In some embodiments, the optical interface 156 may be described as a planar optical interface, where the optical interface 156 is generally planar with respect to a coupling face 151, such as the front face of a connector or a housing of an electronics device (e.g., the optical interface is angled with respect to the coupling face 151 within a range of about zero degrees to about ten degrees). The electronics device may be any electronics device, including, but not limited to, a portable media player, a cellular phone (e.g., a "smart phone"), a data storage device (e.g., an external hard drive or a flash-based memory device), a digital camera, a personal computer, laptop, notebook, or tablet computer, a camcorder, a mobile electronics device, a server, etc. In some embodiments, the optical assembly 100 may be electronically connected to active optical components, such as a laser diode (e.g., a VCSEL, distributed Bragg reflector laser, Fabry-Perot laser, etc.) or a photodiode. The electronics device may be any electronics device wherein transferable media, for example, data is transferred between one electronics device to another electronics device.

Embodiments described herein enable electronics devices to be optically coupled to each other to transfer data optically between the coupled electronic devices. In one embodiment, the electronics devices convert electrical signals into optical signals for optical transmission over the optical cable 80 for receipt by one or more optically coupled electronics devices. The electronics devices may also be configured to receive optical signals over the optical cable 80 and convert such received optical signals into electrical signals.

For optimal coupling, the optical assembly 100 should be aligned with the optical components of a mated optical coupling (not shown). For example, the mated optical coupling may be connected to an electronics device having one or more lasers and photodiodes, while the optical components 140 of the optical assembly 100 are optical fibers. When the optical assembly 100 is coupled to the electronics device, the optical components 140 are aligned with the lasers and the photodiodes for proper optical signal transmission. In some embodiments, the tolerance on alignment should be less than 80 μm for optical coupling. In one embodiment, the tolerance on alignment may be on the order of 30-40 μm, and more preferably, 10-20 μm.

In some embodiments, the alignment between the optical assembly 100 and the electronics devices is provided by at least one positioning feature 153. In some embodiments, a plurality of the positioning features 153 are used and have the form of mechanical features, for example a boss that extends from the ferrule element 110 or a divot that extends into the ferrule element 110 and mates with a corresponding feature of the electronic device (not shown). In other embodiments, the positioning feature 153 may be a coded magnetic array (not shown). The coded magnetic array uses a plurality of magnets that are arranged in a pattern along the coupling face 151 of the ferrule element 110. The coded magnetic arrays allow for random alignment error of single magnet-to-magnet coupling relationships to cancel out. The coded magnetic arrays described herein may allow for optical couplings to self-align with respect to one another.

Figure 2:
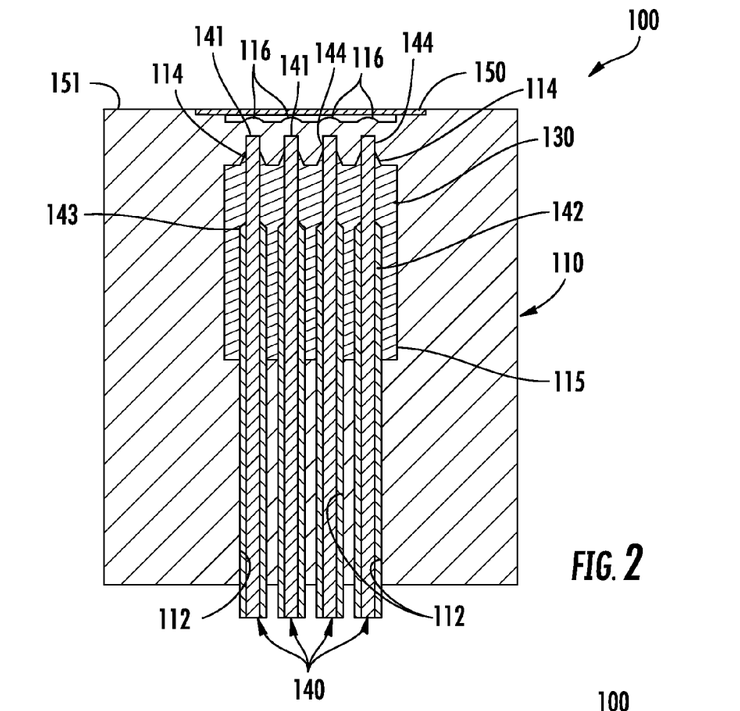
FIG. 2 schematically depicts a top sectional view of an optical assembly according to one or more embodiments shown and described herein along line 2-2 of FIG. 1.

Referring now to FIG. 2, a top sectional view of the optical assembly 100 is depicted. In this embodiment, the optical assembly 100 includes a ferrule element 110 into which the lens cover 150 and the optical components 140 are inserted and retained. The ferrule element 110 includes a plurality of fiber guiding portions 112 that extend through a portion of the length of the ferrule element 110. The ferrule element 110 also includes at least one in-wall locating feature for aligning a respective optical fiber end with a lens, and preferably a plurality of such in-wall locating features 114 that are positioned proximate to the access region 115 of the ferrule element 110 and at least one lens 116, and preferably a plurality of lenses 116, that are positioned proximate to the coupling face 151 of the ferrule element 110. Each of the in-wall locating features 114 and the lenses 116 are aligned, for example, axially aligned with the fiber guiding portions 112 of the ferrule element 110. In the embodiment depicted in FIG. 2, the in-wall locating features 114 are spaced apart from the corresponding fiber guiding portions 112 by an access region 115. An optional index matching gel (not shown) for increasing optical coupling performance can be applied to the end face of the optical fiber adjacent or within the locating feature.

The optical components 140, illustrated for example in FIG. 2, are partially coated optical fibers, and are positioned within the ferrule element 110 with each one passing through a fiber guiding portion 112 and into the access region 115 of the ferrule element 110. The optical components 140 are seated against the in-wall locating features 114 such that the proximal ends 141 of the optical components 140 are axially aligned with the lenses 116 of the ferrule element 110 for transmission of light therebetween.

As depicted, the optical components 140 include a coated portion 142 (i.e., an optical fiber coated with an insulator) and an uncoated portion 144 (i.e., an optical fiber substantially free of the insulator) positioned at the proximal end 141 of the optical component 140 where the optical component 140 interfaces with the in-wall locating feature 114. The coated portion 142 may be separated from the uncoated portion 144 by a transition portion 143. By extending the coating into the access region 115, the robustness of the optical components 140 may be enhanced, such that damage to the optical components 140, for example, damage caused by handling the optical assembly 100, is minimized. Further, the proximal ends 141 of the optical components 140 seated in the in-wall locating features 114 may be secured in position using an optional bonding agent 130, for example, a hardened epoxy. The bonding agent 130 may form a bonded interface between the optical component 140 and the ferrule element 110 that couples the optical component 140 to the ferrule element 110. The strength of the bonded interface may exhibit greater strength when bonded to the uncoated portion 144 than when bonded to the coated portion 142 of the optical component 140 because in some cases the coating may be poorly bonded to the optical fiber. Accordingly, by providing a portion of the uncoated portion 144 in the access region 115, the strength of the bonded interface between the bonding agent 130 and the optical components 140 may, therefore, be enhanced. In this manner, the bonding agent may bond both the coated portion 142 and the uncoated portion 144 of the optical component to the ferrule element. Increased strength of the bonded interface between the ferrule element 110 and the optical component 140 may result in improved robustness of the optical assembly 100.

Figure 3:
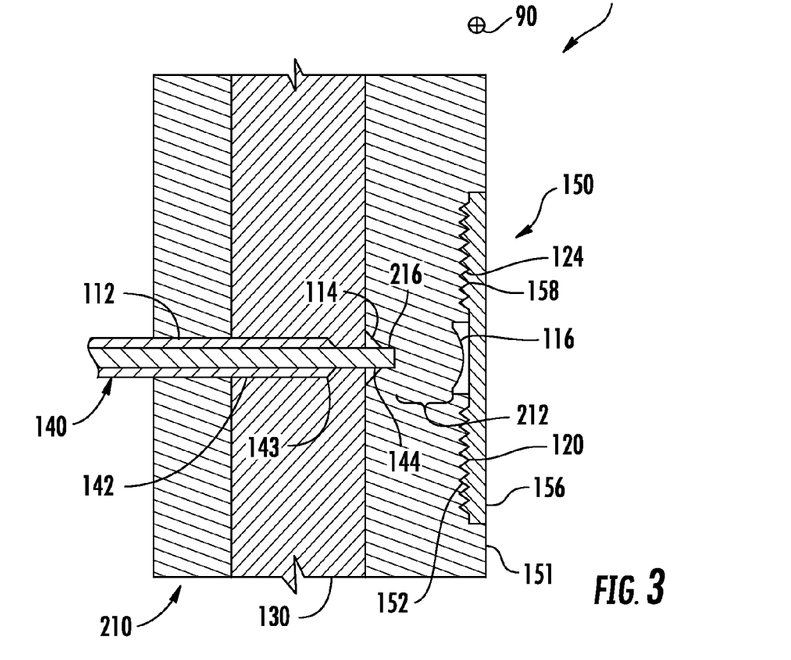
FIG. 3 schematically depicts a side sectional view of an optical assembly according to one or more embodiments shown and described herein along line 3-3 of FIG. 1.

Referring now to FIG. 3, a side sectional view of optical assembly 100 is depicted. In this embodiment, the ferrule element 110 of the optical assembly 100 includes an adhesion surface 120 spaced apart from the coupling face 151. The lens cover 150 includes a connection face 152 positioned opposite the optical interface 156. When the lens cover 150 is coupled to the ferrule element 110, the lens cover 150 is inserted into a recess 146 of the ferrule element 110, such that the connection face 152 of the lens cover 150 contacts the adhesion surface 120 of the ferrule element 110. With the lens cover 150 installed in this orientation, the optical interface 156 is generally parallel to the coupling face 151 of the ferrule element 110.

Portions of the ferrule element 110 positioned between the in-wall locating feature 114 and the lens 116 define a transmissive region 212 of the ferrule element 110. The transmissive region 212 is formed from a material that is optically transmissive and preferably transparent and allows optical signals from the optical components 140 to pass, for example, an industry standard such as ASTM D1003 can be used to ascertain suitable luminous transmittance of transparent plastics such as Polycarbonate (PC) and PMMA (Poly(methyl methacrylate).

In the optical assembly 100 depicted in FIGS. 2 and 3, the lenses 116 include a lens face. Preferably, the lens face is a convex parabolic end face that may decrease the transmission losses in the optical signal transmitted from the optical component 140. The decrease in transmission losses may increase the bandwidth of data that is transmitted by the optical assembly 100.

In some embodiments, portions of the lens cover 150 may be made from a glass material, for example a chemically-strengthened glass such as Gorilla® Glass available from Corning® of Corning, N.Y. In other embodiments, the lens cover 150 may be made from an epoxy or other transparent hardened polymer. In some embodiments, surfaces of the lens cover 150 may be coated with an anti-fouling coating or an anti-reflective coating.

As depicted in FIG. 3, the adhesion surface 120 of the ferrule element 110 and the connection face 152 of the lens cover 150 include a texture that increases the surface area of the adhesion surface 120 and the connection face 152 to a value greater than the projected surface area of the adhesion surface 120 and/or the connection face 152. An increase in surface area of the adhesion surface 120 and/or the connection face 152 may increase the area available for adhesion with a bonding agent between the ferrule element 110 and the lens cover 150, thereby increasing the strength of the bonding interface between the ferrule element 110 and the lens cover 150. As depicted in FIG. 3, both the adhesion surface 120 and the connection face 152 of the lens cover 150 may include serrations 124, 158 that extend in a lateral direction 90. Alternatively, or in addition, one or more of the adhesion surface 120 and the connection face 152 may include a roughened texture formed, for example, by grit blasting or laser ablation. The increase in surface area of the adhesion surface 120 and/or the connection face 152 may increase improve the ability of a bonding agent to form a fluid-tight seal between the ferrule element 110 and the lens cover 150.

Optical assemblies 100 having in-wall locating features 114 in the ferrule element 110 and lens cover 150 as described hereinabove may reduce the internal volume between the ferrule element 110 and the lens cover 150 when the lens cover 150 is installed into the ferrule element 110. By reducing the internal volume of this interface, fluid between the lenses 116 of the ferrule element 110 and the lens cover 150 may similarly be minimized. Reduction in the internal volume between the lenses 116 and the lens cover 150 may prevent an increase in fluid pressure in the internal volume due to heating and expansion of the fluid. An increase in fluid pressure in the internal volume may increase the stress on the bonding interface between the adhesion surface 120 and the connection face 152. An increase in stress on the bonding interface between the adhesion surface 120 and the connection face 152 may tend to encourage separation of the ferrule element 110 and the lens cover 150, thereby decreasing useful life of the optical assembly 100. Accordingly, reducing the fluid pressure in the optical assembly 200 between the lens cover 150 and the lenses 116 is preferred.

As depicted in FIGS. 1-3, a lens cover 150, preferably formed of a single piece, extends across a portion of the ferrule element 110 such that the lens cover 150 covers all of the optical components 140 in the optical assembly 100. Further, the maximum distance between the optical interface 156 and the lenses 116 is small, resulting in low mechanical stresses than are applied to the lens cover 150, which may be caused, for example, by heat applied to the lens cover 150 by the optical components 140. By minimizing the maximum distance between the optical interface 156 and the lenses 116 in the lens cover 150, the maximum temperature gradient between the optical interface 156 and the lenses 116 can be reduced, thereby reducing the mechanical stresses induced into the lens cover 150 by temperature variation.

The optical assemblies 100 described herein may be "liquid displacing" when coupled to a complementary optical interface, such that fluids present on the optical interface 156 are displaced upon coupling with a mating interface on an electronics device, and therefore any moisture does not interfere with the transmission of optical signals from the optical assembly 100 to the electronics device. In some embodiments, the optical interface 156 of the lens cover 150 may be coated with a coating or otherwise treated such that it is hydrophobic, and any liquid present on the optical interface 156 is easily displaced.

The optical interface 156 of the embodiments described herein may be planar and configured to be coupled to a corresponding optical interface of a mated optical coupling (not shown). In one embodiment, the optical interface 156 is configured to physically contact the planar optical interface of a second, mated optical coupling, such that liquid present on the optical interface 156 is displaced to the sides of the optical interface 156. In another embodiment, the planar optical interface 156 is configured to be in close proximity to a mated optical interface when in a coupled relationship. As an illustrative example, the planar optical interface 156 may be configured to be within 100 μm of the planar optical interface of a second, mated optical coupling. Other distances between the optical interface 156 and the second, mated optical coupling may be utilized based on the end-user application.

Figure 4:
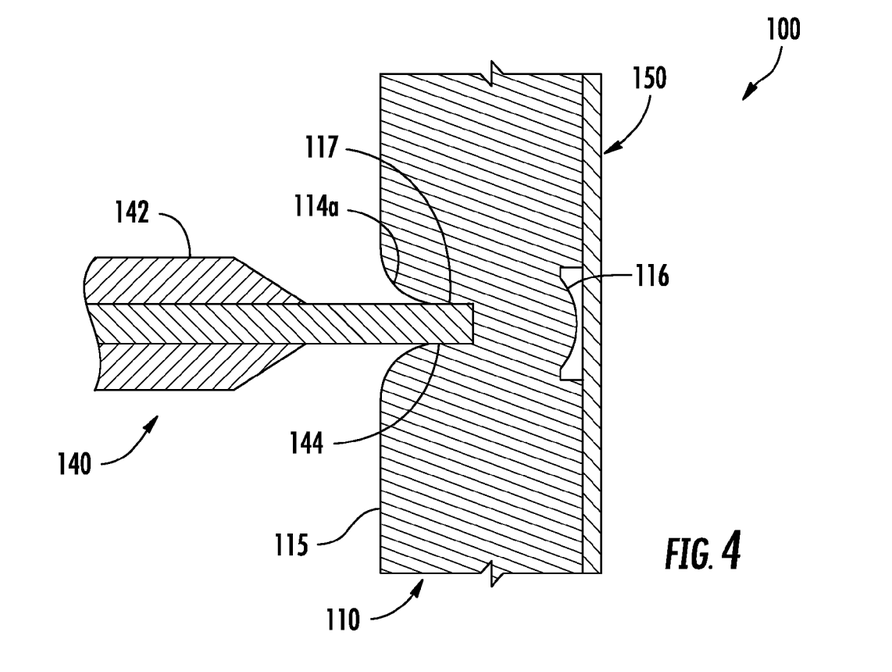
FIG. 4 schematically depicts a detailed side sectional view of an optical assembly according to one or more embodiments shown and described herein along line 3-3 of FIG. 1.
Figure 5:
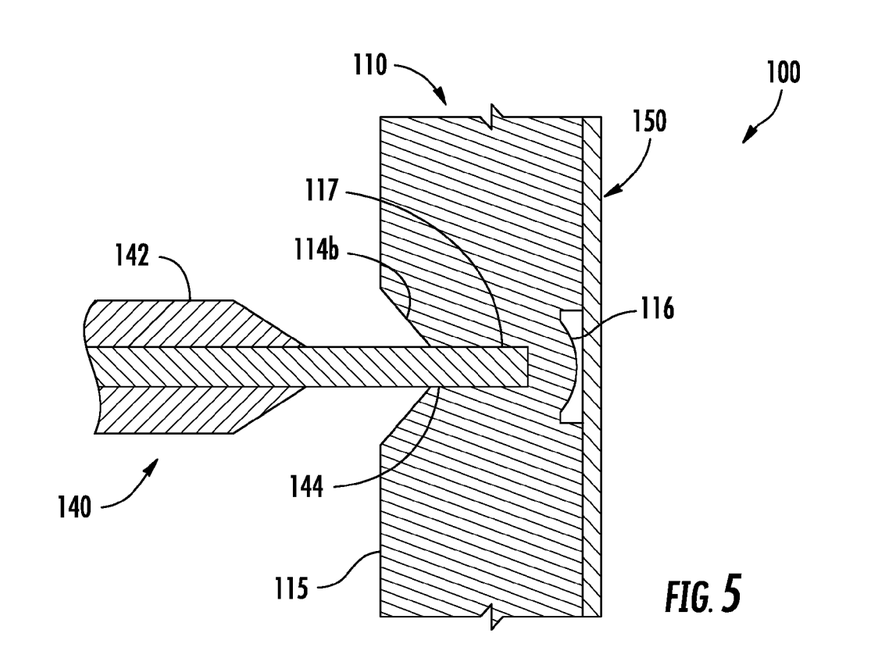
FIG. 5 schematically depicts a detailed side sectional view of an optical assembly according to one or more embodiments shown and described herein along line 3-3 of FIG. 1.

Referring now to FIGS. 4 and 5, two embodiments of the optical assembly 100 having in-wall locating features 114 are shown in detailed sectional view. In the embodiment depicted in FIG. 4, the in-wall locating feature 114 includes a round 114a that transitions the access region 115 of the ferrule element 110 to a cylindrical portion 117. In the embodiment depicted in FIG. 5, the in-wall locating feature 114 includes a chamfer 114b that transitions the access region 115 to a cylindrical portion 117. In both of the embodiments depicted in FIGS. 4 and 5, the in-wall locating features 114 assist with positioning the optical component 140 relative to the cylindrical portion 117, such that alignment between the optical component 140 and the lens 116 is maintained. The cylindrical portion 117 may be configured as a cylindrical bore, for example. As depicted in FIGS. 4 and 5, the diameter of the coated portion 142 of the optical component 140 is greater than the diameter of the cylindrical portion 117. The in-wall locating features 114 therefore accurate positioning of the uncoated portion 144 of the optical component 140 relative to the lens 116. Further, by positioning the optical component 140 with high precision relative to the lens 116, data transmission rates across the optical assembly 100 may be maximized.

In some embodiments, the outer diameter of the uncoated portion 144 of the optical component 140 may be relatively small, such as 50 μm or less. However, at such small outer diameters, the stiffness of the optical component may be poor. Accordingly, in some embodiments, the cylindrical portion 117 may be configured as a confining bore that confines the optical component 140 to keep angles with respect to the proximal end 141 low in the event that the portion of the optical component 140 in the access region 115 buckles. For example, cylindrical portion 117, in some embodiments, may have a length that is one to five times greater than the outer diameter of the uncoated portion 144 of the optical component 140.

Figure 6:
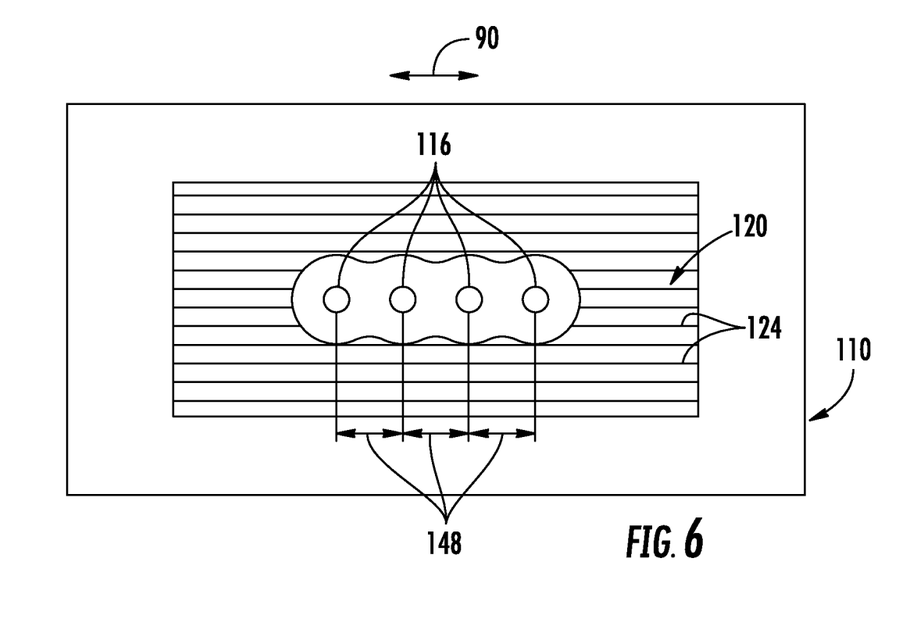
FIG. 6 schematically depicts a front view of a ferrule element of an optical assembly according to one or more embodiments shown and described herein.
Figure 7:
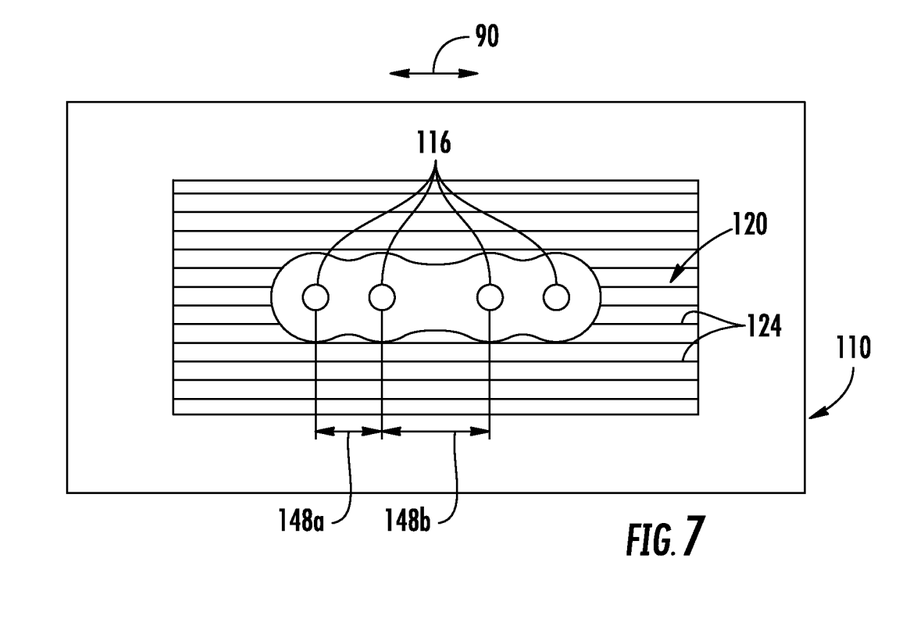
FIG. 7 schematically depicts a front view of a ferrule element of an optical assembly according to one or more embodiments shown and described herein.

Referring now to FIGS. 6 and 7, embodiments of the ferrule elements 110 depicting spacing between lenses 116 that correspond to positions of the optical components 140 (not shown). As depicted, both embodiments of the optical assembly 100 include adhesion surfaces 120 having serrations 124 that extend in a lateral direction 90 of the ferrule element 110. As depicted, the surface area of the adhesion surface 120 having serrations 124 is greater than the surface area projected by the overall dimensions of the adhesion surface 120.

The spacing 148 between the lenses 116 can be modified based on the requirements of the end-user application. Referring to FIG. 6, the embodiment of the optical assembly 100 includes spacing 148 between adjacent lenses 116 that is approximately even in a lateral direction 90 across the ferrule element 110. Referring to FIG. 7, the embodiment of the optical assembly 100 includes spacing between adjacent lenses 116 that is irregular in a lateral direction 90 across the ferrule element 110. The spacing 148a between a first lens 116 adjacent to a second lens 116 is different than the spacing 148b between the second lens 116 adjacent to a third lens 116. The relatively close spacing 148a between the first lens 116 and the second lens 116 may reduce the overall size of the optical assembly 100, while providing sufficient cross-talk separation between adjacent optical components 140 axially aligned with the first and second lenses 116, such that, for example, an optical signal from a first optical component 140 that passes through the first lens 116 does not substantially transmit through the second lens 116, with which a second optical component 140 is aligned. Further, for first and second lenses 116 that have relatively close spacing 148a, optical components 140 that alternately send transmission signals and receiving signals may be grouped together such that the effect of any cross-talk between the adjacent optical components 140 is minimized.

Figure 8:
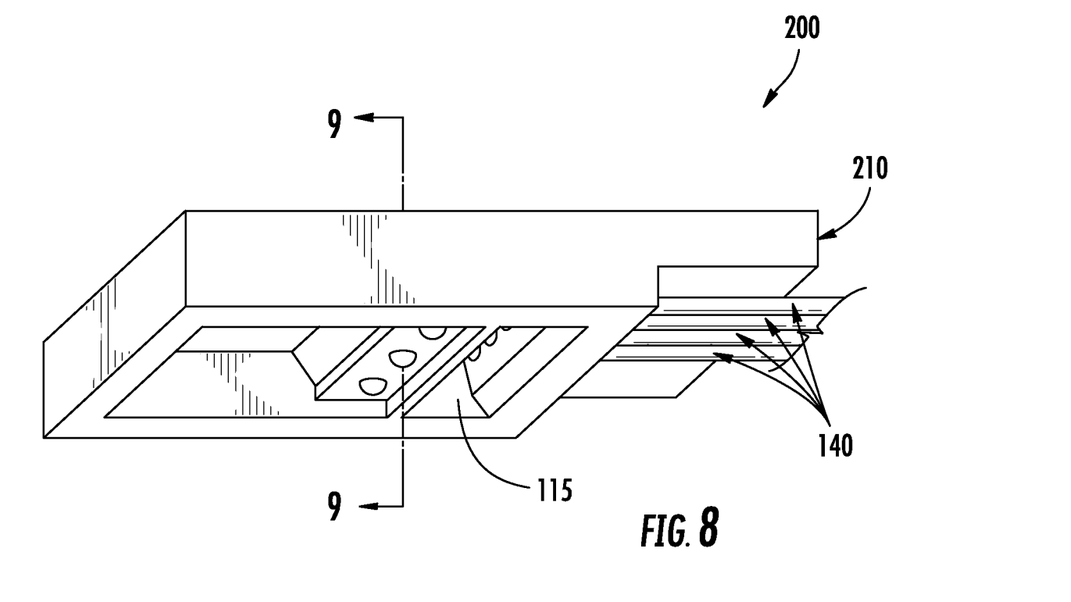
FIG. 8 schematically depicts a perspective view of an optical assembly according to one or more embodiments shown and described herein.
Figure 9:
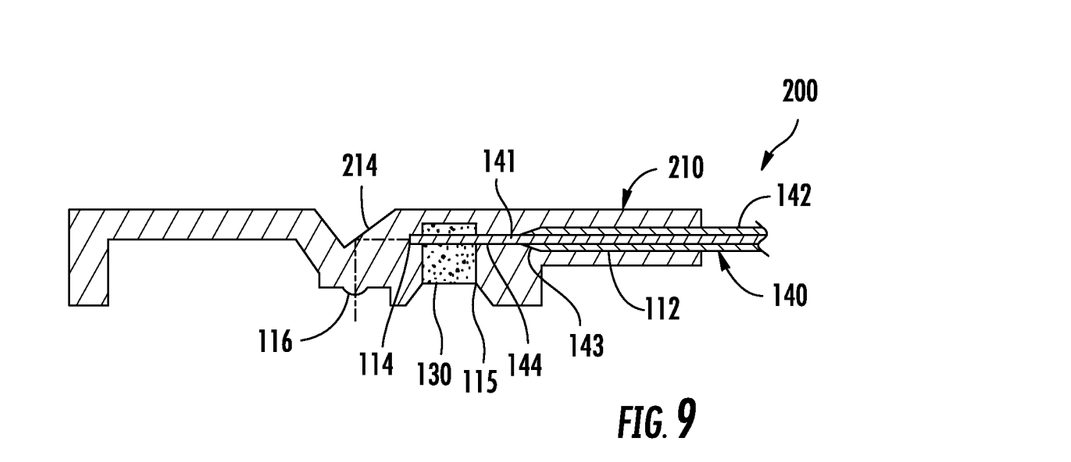
FIG. 9 schematically depicts a side sectional view of an optical assembly according to one or more embodiments shown and described herein along line 8-8 of FIG. 8.

Referring now to FIGS. 8 and 9, another embodiment of the optical assembly 200 is depicted. The optical assembly 200 includes a ferrule element 210 having a fiber guiding portion 112 separated from an in-wall locating feature 114 by an access region 115. The optical assembly 200 also includes a reflecting surface 214, which is biased within the ferrule element 110 and positioned proximate to the in-wall locating feature 114. The optical assembly 200 further includes a lens 116 positioned within the ferrule element 210 and oriented transverse to the fiber guiding portion 112. The optical assembly 200 also includes an optical component 140 extending through the fiber guiding portion 112 and the access region 115 such that a proximal end 141 of the optical component 140 is positioned within the in-wall locating feature 114. The optical component 140 may be secured to the ferrule element 210 by introducing a bonding agent 130 to the access region 115, as discussed hereinabove.

The optical component 140 comprises a coated portion 142 that is coated with an insulator in positions proximate to the fiber guiding portion 112 and an uncoated portion 144 substantially free of the insulator in positions proximate to the in-wall locating feature 114. The lens 116 and the reflecting surface 214 of the ferrule element 110 are positioned such that optical signal emitted by the optical component 140 is directed by the reflecting surface 214 through the lens 116. The optical assembly 200 according to this embodiment may be referred to as a "totally internally reflective" (TIR) connector, as the optical signal emitted by the optical component 140 is turned within the ferrule element 210 itself Still referring to FIGS. 8 and 9, the lens 116 may take a variety of forms including a refractive lens, a diffractive lens, a GRIN lens, and the like, based on the requirements of the end-user application. The selection of lens may allow focusing and/or defocusing of the optical signal emitted by the optical component 140, as to provide the required bandwidth across through the optical assembly 200.

Similar to the previously discussed embodiments, the embodiment of the optical assembly 200 depicted in FIGS. 8 and 9 may also accommodate an optical component 140 that includes a transition portion 143 between the coated portion 142 and the uncoated portion 144. In the embodiment depicted in FIGS. 8 and 9, the transition portion 143 is spaced apart from the in-wall locating feature 114 of the ferrule element 210. In other embodiments, the transition portion 143 may be located after the bonding agent at the in-wall locating feature 114. In still other embodiments, the transition portion 143 may provide a diameter that is greater than an outer diameter of the uncoated portion 144 of the optical component, and a second transition portion (not shown) may be provided as a chamfer at the in-wall feature. Installation of the uncoated portion 144 of the optical component 140 may improve data transmission rates across the optical assembly 200.

It should now be understood that optical assemblies according to the present disclosure include ferrule elements that secure the position of optical components relative to a lens cover. The lens cover includes a substantially planar optical interface that is positioned proximate to optical lenses. Reducing the distance between the lenses and the lens cover allows for reduced internal volume of the optical assembly between the optical component and the lens cover, thereby minimizing internal pressure that can build in the optical assembly. The lens cover may also include features that reduce its size, as to minimize mechanical stress in the lens cover. The ferrule element and the lens cover may include corresponding textured surfaces that increase the bonding interface between the ferrule element and the lens cover, which increases strength and robustness of the optical assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. An optical assembly comprising:
   a ferrule element comprising a fiber guiding portion separated from at least one in-wall locating feature by an access region, an adhesion surface, and at least one lens element positioned opposite the access region and aligned with the in-wall locating feature;
   a lens cover secured against the adhesion surface of the ferrule element, wherein the adhesion surface and the lens cover each comprise a textured portion comprising a plurality of serrations extending in a lateral direction; and
   at least one optical component coupled to and extending through the fiber guiding portion and the access region such that a proximal end of the optical component is positioned within the in-wall locating feature, wherein the optical component comprises a coating, said coating forming a coated portion, the coating being an insulator and disposed in positions proximate to the fiber guiding portion, and the optical component comprises an uncoated portion being substantially free of the insulator in positions proximal to the in-wall locating feature.

2. The optical assembly of claim 1, wherein the in-wall locating feature comprises a cylindrical portion and a chamfer extending between the cylindrical portion and the access region.

3. The optical assembly of claim 1, wherein the in-wall locating feature comprises a cylindrical portion and a round extending between the cylindrical portion and the access region.

4. The optical assembly of claim 1, wherein the optical component further comprises a transition portion between the coated portion and the uncoated portion, and the transition portion is spaced apart from the in-wall locating feature.

5. The optical assembly of claim 1, further comprising a lens cover coupled to the ferrule element and positioned proximate to the lens element.

6. The optical assembly of claim 5, wherein the adhesion surface is positioned opposite the in-wall locating feature to at least partially surround the lens element.

7. The optical assembly of claim 1, further comprising a bonding agent positioned within the access region securing the optical component to the ferrule element.

8. The optical assembly of claim 1, wherein the ferrule element further comprises a plurality of fiber guiding portions and corresponding in-wall locating features, and the optical assembly further comprises a plurality of optical components extending through the fiber guiding portion and the access region such that the proximal end of each of the optical components is positioned within the corresponding the in-wall locating features.

9. The optical assembly of claim 1, wherein the in-wall locating feature comprises a cylindrical portion having a length that is between about one and about five times larger than an outer diameter of the uncoated portion of the optical component.

10. An optical assembly comprising:
a ferrule element comprising a fiber guiding portion separated from an in-wall locating feature by an access region, a lens element positioned opposite the access region and aligned with the in-wall locating feature, and an adhesion surface positioned opposite the in-wall locating feature to at least partially surround the lens element, the adhesion surface having a textured portion; and
a lens cover having a textured portion coupled to the adhesion surface of the ferrule element and positioned proximate to the lens element, wherein the textured portion of the adhesion surface and the textured portion of the lens cover each comprise a plurality of serrations extending in a lateral direction that increases a surface area of the adhesion surface and a surface area of the lens cover as compared to a projected surface area of the adhesion surface and a projected surface area of the lens cover.

11. The optical assembly of claim 10, wherein the in-wall locating feature comprises a cylindrical portion and a chamfer extending between the cylindrical portion and the access region.

12. The optical assembly of claim 10, wherein the in-wall locating feature comprises a cylindrical portion and a round extending between the cylindrical portion and the access region.

13. An optical cable comprising:
a ferrule element comprising a plurality of fiber guiding portions separated from a plurality of corresponding in-wall locating features by an access region, and a plurality of lens elements positioned opposite access region and aligned with the plurality of corresponding in-wall locating features, the ferrule element further comprising an adhesion surface;
a plurality of optical components each coupled to and extending through the plurality of fiber guiding portions and the access region such that a proximal end of each of the optical components is positioned within one of the in-wall locating features, wherein each of the optical components comprise a coated portion that is coated with an insulator in positions proximate to the plurality of fiber guiding portions and an uncoated portion substantially free of the insulator in positions proximal to the plurality of corresponding in-wall locating features; and
a lens cover coupled to the ferrule element and positioned proximate to the plurality of lens elements and secured against the adhesion surface of the ferrule element, wherein the adhesion surface and the lens cover each comprise a textured portion comprising a plurality of serrations extending in a lateral direction.

14. The optical cable of claim 13, wherein the adhesion surface is positioned opposite the plurality of corresponding in-wall locating features to at least partially surround the lens element.

15. An optical assembly comprising:
a ferrule element comprising a fiber guiding portion separated from an in-wall locating feature by an access region, a reflecting surface biased within the ferrule element and positioned proximate to the in-wall locating feature, an adhesion surface positioned opposite the in-wall locating feature, and at least one lens positioned within the ferrule element and oriented transverse to the fiber guiding portion;
an optical component extending through the fiber guiding portion and the access region such that a proximal end of the optical component is positioned within the in-wall locating feature, wherein the optical component comprises a coated portion that is coated with an insulator in positions proximate to the fiber guiding portion and an uncoated portion substantially free of the insulator in positions proximal to the in-wall locating feature, and wherein the lens and the reflecting surface are positioned such that optical signal emitted by the optical component is turned by a total internal reflection surface toward the lens; and
a lens cover secured against the adhesion surface of the ferrule element, wherein the adhesion surface and the lens cover each comprise a textured portion comprising a plurality of serrations extending in a lateral direction.

16. The optical assembly of claim 15, wherein the lens is a refractive lens.

17. The optical assembly of claim 15, wherein the optical component further comprises a transition portion between the coated portion and the uncoated portion, and the transition portion is spaced apart from the in-wall locating feature.

18. The optical assembly of claim 15 further comprising a bonding agent positioned within the access region securing the optical component to the ferrule element.

* * * * *